(12) United States Patent
Matsuda

(10) Patent No.: US 7,873,392 B2
(45) Date of Patent: Jan. 18, 2011

(54) HANDSFREE DEVICE

(75) Inventor: Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 694 days.

(21) Appl. No.: 11/487,787

(22) Filed: Jul. 17, 2006

(65) Prior Publication Data

US 2007/0026904 A1 Feb. 1, 2007

(30) Foreign Application Priority Data

Jul. 27, 2005 (JP) .............................. 2005-217168

(51) Int. Cl.
  H04M 1/00 (2006.01)
  H04M 11/00 (2006.01)
  H04B 1/38 (2006.01)

(52) U.S. Cl. .............. 455/569.2; 455/569.1; 455/550.1; 455/566; 455/567; 379/93.04; 379/93.17

(58) Field of Classification Search ........ 455/567–569.1, 455/569.2; 379/93.04–93.17
See application file for complete search history.

(56) References Cited

U.S. PATENT DOCUMENTS

| | | | | |
|---|---|---|---|---|
| 5,319,803 | A * | 6/1994 | Allen | 455/566 |
| 6,547,620 | B1 | 4/2003 | Hatamura et al. | |
| 6,625,476 | B1 * | 9/2003 | Perng | 455/569.1 |
| 7,113,742 | B2 * | 9/2006 | Kindo et al. | 455/11.1 |
| 7,406,340 | B2 * | 7/2008 | Juengling et al. | 455/569.2 |
| 2003/0064748 | A1 * | 4/2003 | Stulberger | 455/556 |
| 2003/0138080 | A1 * | 7/2003 | Nelson et al. | 379/88.16 |
| 2004/0151285 | A1 * | 8/2004 | Sychta | 379/88.16 |
| 2004/0204069 | A1 * | 10/2004 | Cui et al. | 455/557 |
| 2004/0209605 | A1 * | 10/2004 | Urban et al. | 455/415 |
| 2005/0043014 | A1 * | 2/2005 | Hodge | 455/411 |

FOREIGN PATENT DOCUMENTS

| | | |
|---|---|---|
| JP | 3043962 | 9/1997 |
| JP | 11-266291 | 9/1999 |
| JP | 11-331418 | 11/1999 |
| JP | 2003-298727 | 10/2003 |
| JP | 2005-277788 | 10/2005 |
| WO | WO2005/062597 | 7/2005 |

OTHER PUBLICATIONS

Office action dated Sep. 29, 2009 in corresponding Japanese Application No. 2005-217168.
Office action dated Mar. 23, 2010 in corresponding Japanese Application No. 2005-217168.

* cited by examiner

Primary Examiner—Huy Phan
Assistant Examiner—Kathy Wang-Hurst
(74) Attorney, Agent, or Firm—Harness, Dickey & Pierce, PLC

(57) ABSTRACT

A handsfree device in communication with a remote communication device by one of wireless communication and wired communication for establishing a handsfree call includes a call interruption detection unit for detecting a call interruption by a second call while the remote communication device is involved in a first call and a response command transfer unit for transferring a response command to the remote communication device in response to the call interruption when the call interruption is detected by the call interruption detection unit.

22 Claims, 4 Drawing Sheets

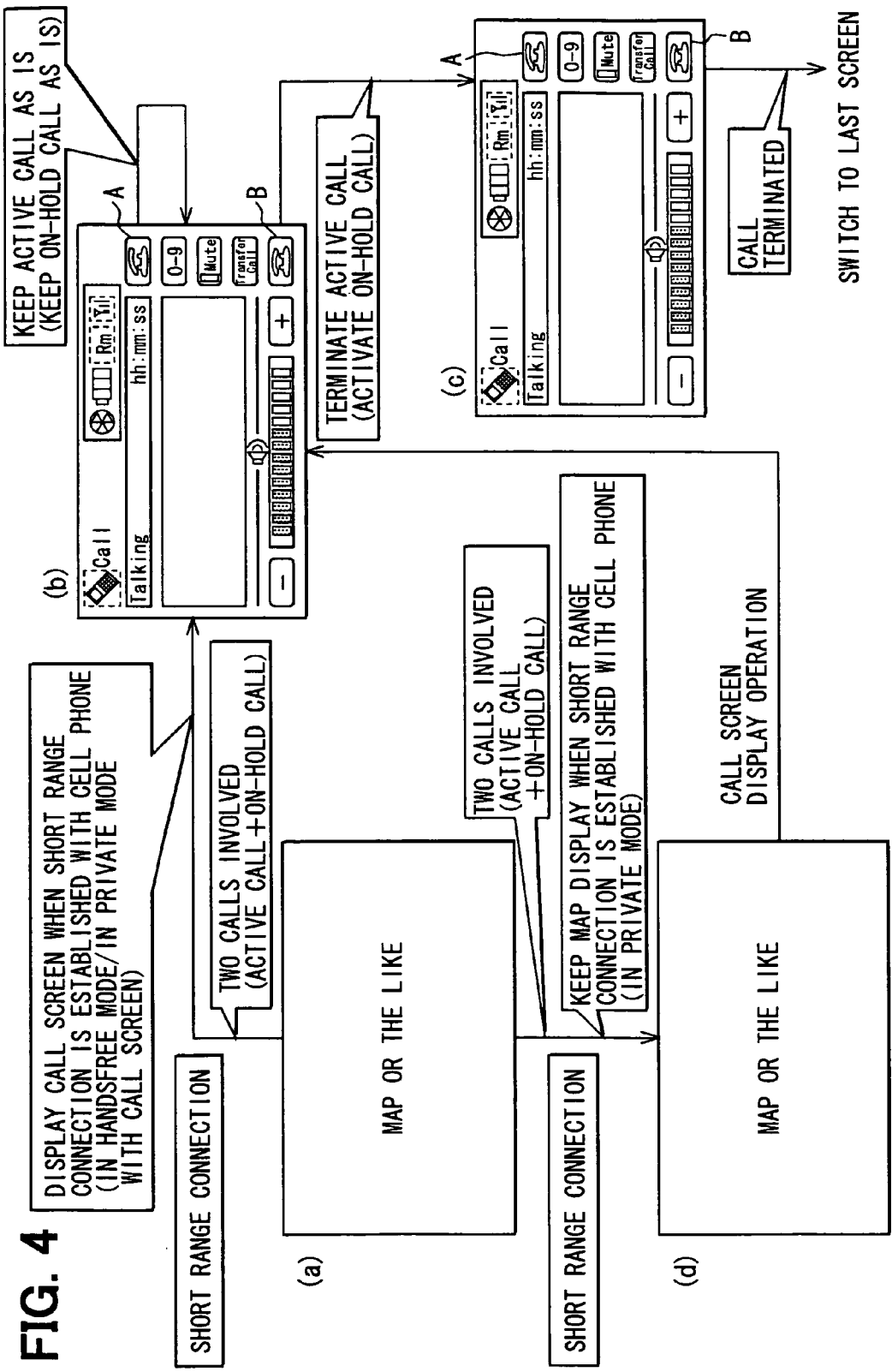

HANDSFREE DEVICE

CROSS REFERENCE TO RELATED APPLICATION

This application is based on and claims the benefit of priority of Japanese Patent Application No. 2005-217168 filed on Jul. 27, 2005, the disclosure of which is incorporated herein by reference.

FIELD OF THE INVENTION

The present invention generally relates to a handsfree device used in connection with a mobile communication device.

BACKGROUND OF THE INVENTION

In recent years, a handsfree device in, for example, a vehicle and a mobile communication device such as a cellular phone are connected wirelessly by using BLUETOOTH (Registered trademark) connection or connected by wire for placing and receiving a call. Description in Japanese Patent Document JP-A-2003-298727 discloses the handsfree device that is capable of connecting to the cell phone by using the BLUETOOTH connection.

The cellular phone having subscription to a call waiting service or the like provided by a communication carrier is capable of receiving a second call while being involved in a first call. That is, the first call is held in waiting for picking up the second call, or the second call is held in waiting for resuming the first call.

The conventional handsfree device does not have a specific operation switch for the call waiting service. Therefore, a user of the cellular phone has to switch the calls by operating a key disposed on the cellular phone.

However, the operation of the key of the cellular phone for using the call waiting service is not necessarily convenient for the user, nor distraction caused by operating the key on the cellular phone may be appropriate while the user is involved in driving a vehicle or the like.

SUMMARY OF THE INVENTION

In view of the above-described and other problems, the present disclosure provides a handsfree device that establishes a call of a call waiting service without manual operation of a cellular phone.

A handsfree device in communication with a remote communication device (a cellular phone) by one of wireless communication and wired communication for establishing a handsfree call includes a call interruption detection unit for detecting a call interruption by a second call while the remote communication device is involved in a first call and a response command transfer unit for transferring a response command to the remote communication device in response to the call interruption when the call interruption is detected by the call interruption detection unit.

The handsfree device transfers the response command to the cellular phone for picking up the second call by the response command transfer unit when the call interruption is detected by the detection unit. In this manner, the second call is established without performing an operation of the cellular phone.

The response command transfer unit may include a call switch command transfer unit and a call terminate command transfer unit. A selector switch for switching between the calls and a terminate switch for terminating the call displayed on a display unit may be used for responding to the call interruption caused by the second call. The selector switch and the terminate switch may be disposed on a steering wheel of a vehicle for transferring the switch command and the terminate command. The switch command may be transferred based on an operation of an off-hook switch that may be disposed on the steering wheel as a call key or a touch switch on the display unit. The terminate command may be transferred based on an operation of an on-hook switch that may be disposed on the steering wheel as a terminate key or a touch switch on the display unit.

The handsfree device displays a caller's number and/or a caller's name of the second call based on reception of those information. The reception of those information is determined by using a reception determination unit.

The caller's number and the caller's name of the first call and the second call are displayed on the display unit in respectively different forms. In this manner, a user of the cellular phone can distinguish the caller's number and/or the caller's name.

BRIEF DESCRIPTION OF THE DRAWINGS

Other objects, features and advantages of the present invention will become more apparent from the following detailed description made with reference to the accompanying drawings, in which:

FIG. 4 shows illustrations of screens displayed on the display unit in the navigation system.

DETAILED DESCRIPTION OF THE PREFERRED EMBODIMENTS

Figure 1:
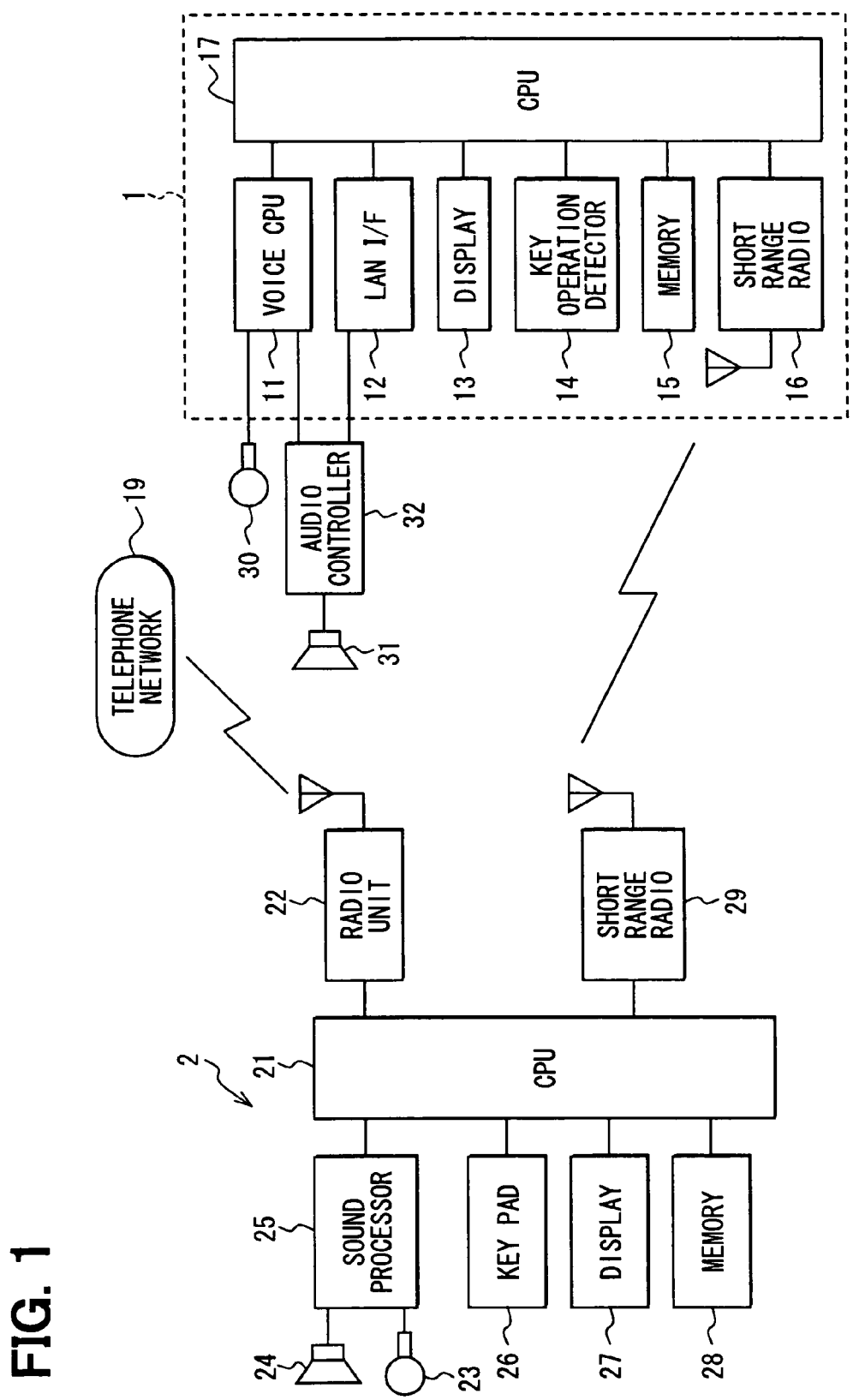
FIG. 1 shows a block diagram of a handsfree device and a cellular phone in a first embodiment of the present disclosure.

A handsfree device of the present disclosure is described with reference to the drawings. FIG. 1 shows a block diagram of the handsfree device and a cellular phone in a first embodiment of the present disclosure. The handsfree device is realized as a part of a navigation system 1 in a vehicle, and a mobile communication device is realized as a cellular phone 2 in the present disclosure. The navigation system 1 has following components around a face of a user/driver and/or on a door of the vehicle. That is, a microphone 30, and a speaker 31 are used for inputting/outputting a voice signal controlled by an audio controller 32.

The navigation system 1 includes a CPU 17, a voice CPU 11 for controlling a voice input from the microphone 30 and a voice output from the speaker 31, a vehicle LAN interface 12 for connecting the CPU 17 through a vehicle LAN to the audio controller 32, a display 13 for displaying an image based on an image signal from the CPU 17, a key operation detector 14 for detecting an input from a touch switch disposed on the display 13 or a key pad around the display 13, a memory 15 having ROM, RAM or the like, and a short range radio 16 for establishing a short range connection to the cellular phone 2. In addition, the navigation system 1 includes a position detector for detecting a position of the vehicle based on a signal from a GPS receiver, and a map data input device for inputting map data (both parts not shown in the figure). The memory 15 stores telephone directory data for recording plural sets of a caller name and a phone number.

The navigation system 1 has an off-hook switch for placing a call and an on-hook switch for terminating a call both disposed on a steering wheel (not shown in the FIGURE). That is, the steering wheel has a steering switch unit that includes off-hook/on-hook switches for remotely controlling the cellular phone. A signal from the steering switch unit is sent to the CPU 17 through the key operation detector 14.

The cellular phone 2 includes a CPU 21, a radio unit 22 for controlling communication with a telephone network 19, a sound processor 25 for controlling a voice input/output through a microphone 23 and a speaker 24, an off-hook/on-hook key, a key pad 26 having numeric keys and other keys, a display 27 for displaying a time, a date and the like, a memory 28 having a RAM, a ROM and the like, a short range radio 29 for establishing a short range connection to the navigation system 1.

The short range connection between the navigation system 1 and the cellular phone 2 is established by, for example, BLUETOOTH connection (registered trademark), an infrared connection or the like.

The cellular phone 2 operates either in a handsfree mode that utilizes a handsfree function on the navigation system 1 for placing/receiving a call or in a private mode that utilizes functions on the cellular phone 2 function only for handling a call. The handsfree mode and the private mode are switched by using a key on the cellular phone 2, or by using a transfer key on the navigation system 1 described later. In addition, operation of the steering switch unit is effective in the handsfree mode, and operation of the steering switch unit is invalid in the private mode.

The cellular phone 2 transfers a notification of an arrival of a second call to the navigation system 1 through the short range radio 29 when it is involved in a first call.

Further, the cellular phone 2 may or may not transfer a notification of a switched caller number when it receives a switch command from the navigation system 1. Furthermore, the cellular phone 2 may or may not transfer a response command in response to a terminate command when it receives the terminate command from the navigation system 1.

The CPU 17 of the navigation system 1 operates by having provision of electricity from a battery (not shown in the figure) in the vehicle. The navigation system 1 displays on the display 13 a navigation screen such as a map screen for displaying a nearby area map with a vehicle position mark upon receiving input from the user.

The display 13 displays a call screen when the user provides an operation to the navigation system 1 to display the call screen, or when the call from another phone is connected to the cellular phone 2. The call from another phone to the cellular phone 2 is relayed by the short range connection between the cellular phone 2 and the navigation system 1.

Figure 2:
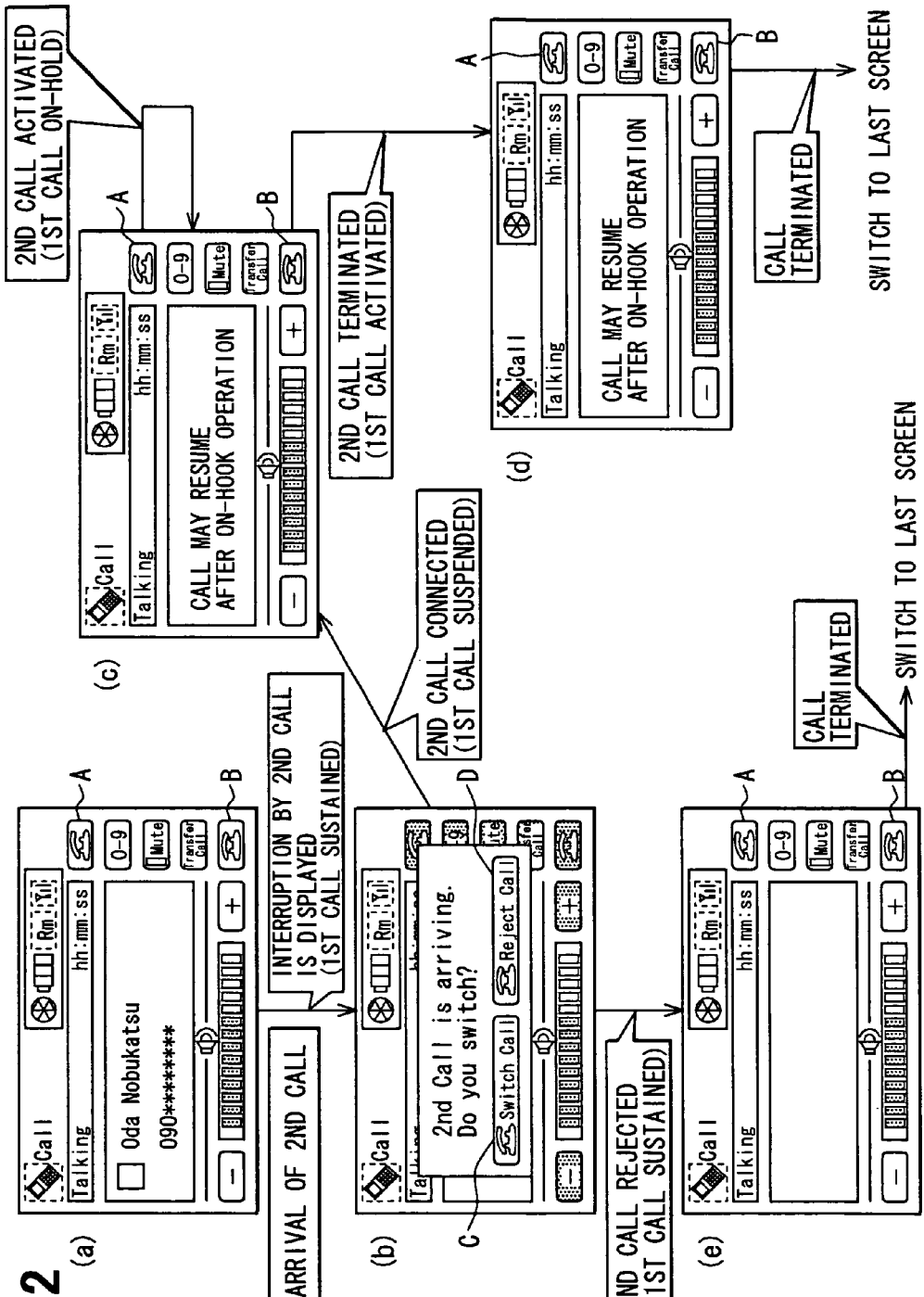
FIG. 2 shows illustrations of screens displayed on a display unit in a navigation system.

FIG. 2 shows illustrations of screens displayed on a display 13 in the navigation system.

FIG. 2(*a*) shows an illustration of the call screen. As shown in FIG. 2(*a*), the call screen displays a call condition, a call time, a caller name, a phone number, an off-hook switch A, an on-hook switch B, numeric keys of 0 to 9, various control key for volume control and the like, a mute key for muting a sound from the speaker 31, a transfer key for switching between the private mode and the handsfree mode, a battery indicator, a signal indicator and the like.

Figure 3:
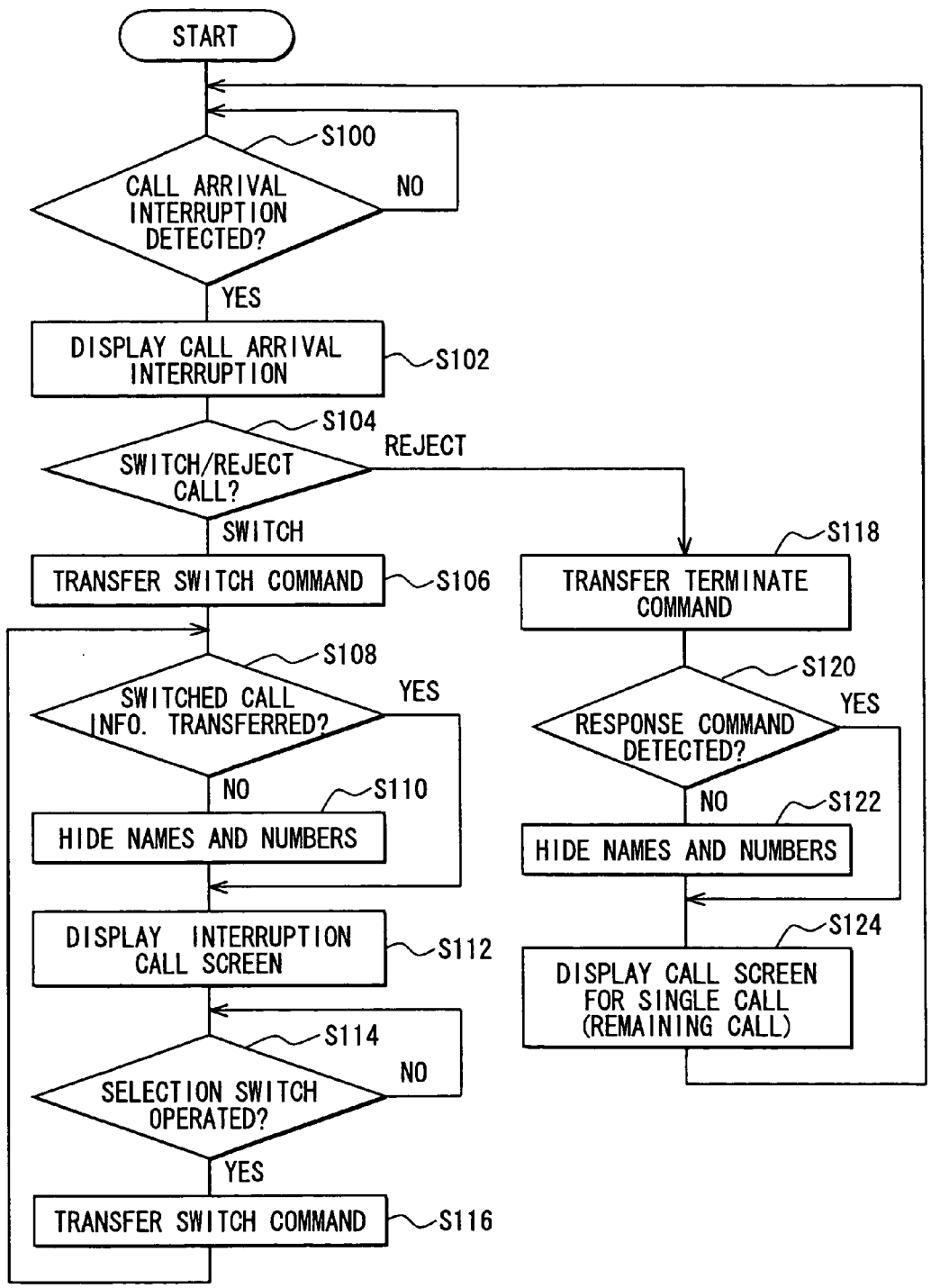
FIG. 3 shows a flowchart of a process executed in a CPU of the navigation system.

FIG. 3 shows a flowchart of a process executed in the CPU 17 of the navigation system 1. In this case, the cellular phone 2 is used inside of the vehicle, and the short range connection between the cellular phone 2 and the navigation system 1 is established. In addition, the user has an option whether the caller name and the phone number are displayed/are not displayed on the display 13 in the navigation system 1. In the present embodiment, the call screen displays the caller name and the telephone number. The navigation system 1 in the present embodiment is set in the handsfree mode. The CPU 17 in the navigation system 1 executes the process shown in a flowchart in FIG. 3 besides displaying the call screen in FIG. 2(*a*) when the call between the cellular phone 2 and another phone is established.

The process determines whether the cellular phone 2 has a call arrival interruption while placing a call to the another phone in step S100. More practically, the process detects the call arrival interruption when the short range radio 16 receives the notification of the second call arrival from the cellular phone 2. The process repeats step S100 when no notification is received by the short range radio 16 (step S100: NO). The process proceeds to step S102 when the notification of the second call arrival is received (step S100: YES).

In step S102, the process displays a second call screen on the display 13 as shown in FIG. 2(*b*). More practically, the process displays a selection switch C for switching to the second call and a reject switch D for rejecting the second call on the screen in the display 13, and encourages the user to select one of two switches on the screen. The process proceeds to step S104 after displaying the call arrival interruption.

In step S104, the process determines which of the two switches the user has selected. That is, the process determines whether the second call is picked up.

The process proceeds to step S106 when the switch C is selected by the user on the screen, or when the off-hook switch in the steering switch unit is operated. The process transfers the switch command to the cellular phone 2 through the short range radio 16 in step S106 (step S104: SWITCH). The cellular phone 2 switches from the first call to the second call when it receives the switch command by putting the first call on-hold. That is, the cellular phone 2 is in an interrupted condition. The process proceeds to step S108 after step S106.

In step S108, the process determines whether switched call information is notified. That is, the process determines whether the cellular phone 2 transferred phone number information of the second call by using the short range radio 16. Determination of the phone number information notification is required because the cellular phone 2 may or may not notify the phone number of the switched call depending on a phone type when the switch command from the navigation system 1 is transferred.

The process proceeds to step S110 when the switched call information is not notified (step S108: NO), and hides the names and the phone numbers of both of the first call and the second call. The names and the phone numbers of the both calls are hidden because the cellular phone 2 in some cases may not notify the second call information and makes it ambiguous that the cellular phone 2 is involved in which of the two calls.

The process proceeds to step S112 after hiding the names and the numbers. In step S112, the process displays an interruption call screen. The names and the phone numbers are not displayed when those attributes are determined to be hidden in step S110.

The process displays the names and the phone numbers of the first and the second callers in step S112 when determination in step S108 is affirmative (step S108: YES). in this case, the names and the phone numbers are displayed on the screen by using the telephone directory data stored in the memory 15.

The interruption call screen displays a message such as "Call may resume after on-hook operation" or the like. That is, when the user selects the on-hook switch/operation of the interruption call screen, the process transfers the terminate command to the cellular phone 2 to terminate the second call, and the call on-hold will be resumed. Resumption of the call on-hold will be notified in advance to the user in the above-described manner.

Then, the process proceeds to step S114, and determines whether the user has switched between the two calls by using a selection switch. More practically, the process determines whether one of the off-hook switch A in the screen on the display 13 and the off-hook switch on the steering switch unit (not shown in the figure) is operated. These off-hook switches transfers the switch command when the cellular phone 2 is involved in the call.

The process repeats step S114 when the off-hook switch is not operated in step S114 (step S114: NO). The process returns to step S108 after transferring the switch command in step S116 to the cellular phone 2 by the short range radio 16 when the off-hook switch is operated (step S114: YES).

The cellular phone 2 puts an active call on-hold and resumes the call on-hold when it receives the switch command. That is, the process in steps S108 to S116 is repeated to alternatively activate the first call and the second call whenever the user operates the selection switch (the off-hook switch) to transfer the switch command from the navigation system 1 to the cellular phone 2. The names and the phone numbers also alternate when determination in step S108 has been affirmed.

The operation of the on-hook switch B on the screen in the display 13 or the operation of the on-hook switch on the steering switch unit (not shown in the figure) during the process in steps S108 to S116 results in transferring the terminate command to the cellular phone 2 through the short range radio 16. This process of terminate command transfer is not shown in FIG. 3. The terminate command transfer terminates the active call, and resumes the call on-hold.

An example of the call screen for the above-described situation is shown in FIG. 2(d). The cellular phone 2 that does not transfer the response command in response to the terminate command from the navigation system 1 makes it impossible for the navigation system 1 to confirm the termination of the call. Therefore, the navigation system 1 continues displaying a message such as "Call may resume after on-hook operation" or the like when the cellular phone 2 is above-identified type.

The CPU 17 transfers the terminate command to the cellular phone 2 when it detects the operation of the on-hook switch B or the on-hook switch in the steering switch unit while the call screen having the above message is displayed. The transfer of the terminate command terminates the call. The screen of the display 13 returns to the navigation screen that is displayed before the screen is switched to the call screen in FIG. 2(a).

In step S118, the process transfers the terminate command to the cellular phone 2 through the short range radio 16 when the switch D is selected in step S104 (step S104: REJECT) or the on-hook switch in the steering switch unit is operated by the user.

The cellular phone 2 terminates the second call when it receives the terminate command. That is, the cellular phone 2 returns to a state where it has only one established call before having the interruption by the second call.

In step S120, the process determines whether the cellular phone 2 transfers the response command in response to the terminate command. This is because the cellular phone 2 may or may not transfer the response command depending on the type of the model.

In step S122, the process hides the names and the phone numbers when the response command is not transferred (step S120: NO).

Then, in step S124, the process displays the call screen for a single call (i.e., a remaining call, or the call not terminated in step S120) on the display 13 as shown in FIG. 2(e). The call screen for the single call does not display the name of the caller and the phone number.

The process displays the names and the phone numbers in the call screen for the single call when the response command is transferred in step S124 (step S120: YES). That is, the call screen displays the name and the phone number of the caller as shown in FIG. 2(a), and the process returns to step S100.

The operation of the on-hook switch B in the call screen for the single call in FIG. 2(e) terminates the call by transferring the terminate command to the cellular phone 2. The screen on the display 13 returns to, for example, the navigation screen that is shown on the display 13 before switching to the call screen. The process concludes itself after returning to the navigation screen.

The navigation system 1 in the above-described operation scheme detects and determines an call interruption of by the second call when the cellular phone 2 is involved in the first call (step S100), and has an operation unit for transferring the response command for responding to the call interruption. In this manner, the call interruption is managed by the operation unit disposed in the navigation system 1 without operating the key pad 27 of the cellular phone 2.

Further, the switch command for switching the calls between the first call (an original call) and the second call (arriving call) can be transferred by operating the dedicated selection switch C for responding to the call interruption in FIG. 2(b) or by operating the off-hook switch A in FIG. 2(c). The switch command can also be transferred by operating the off-hook switch in the steering switch unit.

Furthermore, the terminate command can be transferred by operating the dedicated reject switch D for responding to the call interruption in FIG. 2(b), or by operating the on-hook switch B in FIG. 2(c). The terminate command can also be transferred by operating the on-hook switch in the steering switch unit.

Second Embodiment

A second embodiment of the present disclosure is described with reference to the drawings. In the second embodiment, the cellular phone 2 is brought into the vehicle while it is involved in the second call with the first call being interrupted and on-hold. The navigation system 1 is displaying the map screen or the like when the cellular phone 2 is brought into the vehicle. The cellular phone 2 is connected to the navigation system 1 by the short range radio when it is brought into the vehicle.

The navigation system 1 is capable of displaying the caller's name and number when an option of the display item is so specified.

The navigation system 1 displays a call screen shown in FIG. 4(b) when the cellular phone 2 is in the handsfree mode, or when the cellular phone 2 is in the private mode while display option of the navigation system 1 is set to display the caller's name/number. The display unit 13 of the navigation system 1 switches from the map screen (FIG. 4(a)) to the call screen (FIG. 4(b)). The call screen shows the first and second caller's name/number in an actual use condition.

Operation of the off-hook switch A on the display unit 13 alternates the two calls. That is, when the first call is on-hold and the second call is activated, the first call becomes active and the second call is put on-hold, and when the second call is on-hold and the first call is activated, the second call becomes active and the first call is put on-hold after the operation of the off-hook switch A on the display unit 13. The caller's names/numbers on the call screen are also switched in synchronization with the switch of the call.

Operation of the on-hook switch B on the display unit 13 transfers the terminate command from the navigation system 1 to the cellular phone 2, thereby terminating the active call and activating the on-hold call. In this case, the call screen is kept in the same condition as the call screen in FIG. 4(c). The call screen may display the caller's name/number and call duration time in an actual use condition.

The operation of the off-hook switch A does not change the call screen nor the call condition in this situation. The operation of the on-hook switch B transfers the terminate command from the navigation system 1 to the cellular phone 2 for terminating the active call of the cellular phone 2. Then, the call screen on the display unit 13 returns the map screen or the like as shown in FIG. 4(a).

The screen on the display unit 13 does not change to the call screen when the cellular phone 2 in the private mode is brought into the vehicle with an interruption call arriving to the phone 2. That is, the screen does not change when the cellular phone 2 and the navigation system 1 is connected by the short range radio connection, and the screen keeps showing a road map or the like as shown in FIG. 4(d). In this case, the user operates the key pad on the cellular phone 2 to alternate the active/on-hold calls, or to terminate the active call.

Further, the user can display the call screen as shown in FIG. 4(b) by the operation of a push switch or the like around the display unit 13 of the navigation system 1 when the cellular phone 2 is in the private mode.

Although the present invention has been fully described in connection with the preferred embodiments thereof with reference to the accompanying drawings, it is to be noted that various changes and modifications will become apparent to those skilled in the art.

For example, the connection between the navigation system 1 and the cellular phone 2 may use a wired connection instead of a wireless connection.

The cellular phone 2 may be replaced with a PDA or other type of communication terminal.

The screen display of the selection switch C and the reject switch D may be replaced with the operation of the off-hook switch A and the operation of the on-hook switch B in FIG. 2(a) in terms of transferring the switch command or the terminate command to the cellular phone 2 in step S102.

The selection switch C and the reject switch D in FIG. 2(b), the off-hook switch A and the on-hook switch B in FIG. 2(c) and the off-hook/on-hook switches in the steering switch unit may be replaced with a button switch or the like disposed on the navigation system 1 in terms of transferring the switch command and/or the terminate command. Further, a remote controller (not shown in the figure) may be used to transfer those switch/terminate command.

A long-press (for more than three second, for example) of the operation switch such as the selection switch, the reject switch, the off-hook switch, the on-hook switch or the like may be recognized as an effective operation of the operation switches in order to prevent false switch operation.

The call screen described in step S112 for displaying the caller's name/number of the switched call may be transferred from the cellular phone 2 instead of retrieved from the telephone directory data stored in the memory 15.

The call screen in the navigation system 1 may selectively display one or both of the name of the caller and the number of the caller based on the settings of the display option.

The name and the number of the on-hold caller may also be displayed on the call screen in step S112. Further, one or both of the name and the number of the on-hold caller may be selectively displayed on the call screen.

Such changes and modifications are to be understood as being within the scope of the present invention as defined by the appended claims.

What is claimed is:

1. A handsfree device in communication with a remote communication device by short range wireless communication for establishing a handsfree call, the handsfree device comprising:
   a display unit for displaying a call screen having at least a terminate switch to terminate the handsfree call when the remote communication device is having the handsfree call;
   a call detection unit for detecting an incoming call while the remote communication device is involved in a current call;
   a switch display unit for displaying a selector switch in the call screen, the selector switch switching between the current call and the incoming call when the call detection unit detects the incoming call; and
   a call switch command transfer unit for transferring a call switch command that alternatively activates the current call and the incoming call according to an operation on the selector switch, wherein
   the switch display unit immediately displays the selector switch for switching back to the current call when both of two conditions are fulfilled: (a) the remote communication device had received the incoming call while involved in the current call, and (b) the remote communication device having the activated incoming call and the on-hold current call is brought into a vehicle and connected with both the activated incoming call and the on-hold current call to the handsfree device by the short range wireless communication.

2. The handsfree device as in claim 1 further comprising:
   a call terminate command transfer unit for transferring a call terminate command that terminates the incoming call in response to the operation of a terminate switch displayed in the call screen on the display unit; wherein the switch display unit displays the terminate switch in the call screen.

3. The handsfree device as in claim 2,
   wherein the selector switch and the terminate switch are displayed in the call screen on the display unit when the call detection unit detects the incoming call.

4. The handsfree device as in claim 1 further comprising:
   an off-hook switch disposed on a steering wheel separately from the selector switch for establishing a handsfree call,
   wherein the call switch command transfer unit transfers the switch command based on an operation of the off-hook switch.

5. The handsfree device as in claim 4, wherein the off-hook switch is a touch switch disposed on the display unit.

6. The handsfree device as in claim 4, wherein the off-hook switch is a mechanical switch on a steering wheel of a vehicle.

7. The handsfree device as in claim 2 further comprising:
   an on-hook switch disposed on a steering wheel separately from the selector switch for terminating a call, wherein the terminate command transfer unit transfers the terminate command based on an operation of the on-hook switch.

8. The handsfree device as in claim 7, wherein the on-hook switch is a touch switch on the display unit.

9. The handsfree device as in claim 7, wherein the on-hook switch is a mechanical switch on the steering wheel of the vehicle.

10. The handsfree device as in claim 3 further comprising:
a reception determination unit for determining whether at least one of a caller's number and a caller's name is received when the call switch command is transferred to the remote communication device; and
a number display unit for displaying at least one of the caller's number and the caller's name when reception of at least one of the caller's number and the caller's name is determined by the reception determination unit.

11. The handsfree device as in claim 10, wherein at least one of the caller's number and the caller's name of the current call on the number display unit is distinctively different from the at least one of the caller's number and the caller's name of the incoming call on the number display unit.

12. The handsfree device as in claim 10 further comprising:
a number display attribute setting unit for setting a number display hiding condition that hides at least one of the caller's number and the caller's name of the incoming call when reception of at least one of the caller's number and the caller's name of the incoming call is not determined by the reception determination unit.

13. The handsfree device of claim 1, wherein the display unit displays a map screen, the display unit displays a call screen instead of the map screen for having the current call when the current call arrives and is activated during the display of the map screen, and
when the call detection unit detects the incoming call while the display unit displays the call screen for having the current call, the display unit starts to display the selector switch and the terminate switch in the call screen.

14. The handsfree device as in claim 13, wherein
the display of the selector switch and the terminate switch in the call screen is performed for the first time after the start of the display of the call screen, when the call detection unit detects the incoming call.

15. The handsfree device of claim 1, wherein the remote communication device is a cellular phone.

16. The handsfree device of claim 15 wherein the handsfree device is a navigation system.

17. The handsfree device of claim 1 wherein the handsfree device is a navigation system.

18. A communication system comprising:
a remote communication device which receives and initiates wireless communication;
a handsfree device in short range wireless communication with the remote communication device establishing a handsfree wireless communication through the remote communication device;
a display unit on the handsfree device for displaying a call screen having a terminate switch to terminate the handsfree wireless communication;
a call detection unit for detecting an incoming call while the remote communication device is involved in a current call;
a switch display unit for displaying a selector switch in the call screen, the selector switch switching between the current call and the incoming call when the call detection unit detects the incoming call; and
a call switch command transfer unit for transferring a call switch command that alternatively activates the current call and the incoming call according to an operation on the selector switch, wherein
the switch display unit immediately displays the selector switch in the call screen on the display unit for switching the picked-up incoming call back to the current call when (a) the remote communication device had received the incoming call while involved in the current call, and (b) the remote communication device having the activated incoming call and the on-hold current call is brought into a vehicle and connected with both the activated incoming call and the on-hold current call to the handsfree device by the short range wireless communication.

19. The communication system of claim 18, wherein the remote communication device is a cellular phone.

20. The communication system of claim 18 wherein the handsfree device is a navigation system.

21. A handsfree device in communication with a remote communication device by a short range wireless communication for establishing a handsfree wireless communication, the handsfree device comprising:
a display unit;
a display controller for displaying a selector switch, on the display unit, to switch at least two handsfree wireless communications, when the remote communication device, which (a) had switched an activated first call to an interrupting second call, and (b) had no short range wireless communication and has subsequently connected to the handsfree device by the short range wireless communication; and
a call switch command transfer unit for transferring a call switch command that switches from the second call back to the on-hold first call according to an operation on the selector switch; wherein
the display controller immediately displays the selector switch for switching back to the first call when both of two conditions are fulfilled: (a) the remote communication device had received the second call while involved in the first call, and (b) the remote communication device having the activated second call and the on-hold first call is brought into a vehicle and connected with both the activated second call and the on-hold first call to the handsfree device by the short range wireless communication.

22. The handsfree device of claim 21 further comprising:
a call terminate command transfer unit for transferring a call terminate command that terminates the second call according to an operation on a terminate switch, wherein
the display controller displays the terminate switch on the display unit together with the selector switch.

* * * * *